UNITED STATES PATENT OFFICE.

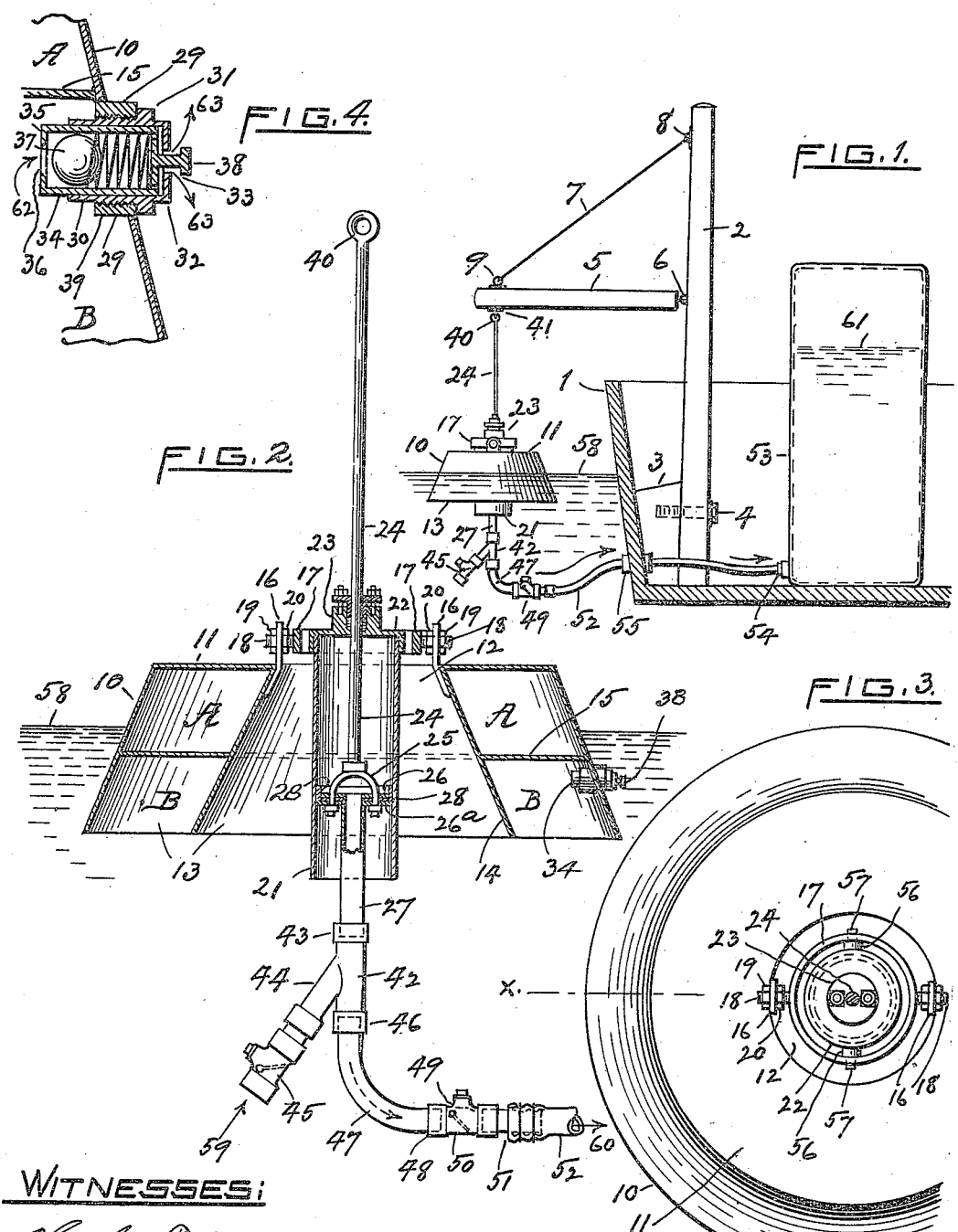

CHARLES P. BONNEY, OF PROVIDENCE, RHODE ISLAND.

WAVE-OPERATED PUMP.

961,401.  Specification of Letters Patent.  Patented June 14, 1910.

Application filed May 12, 1909. Serial No. 495,404.

*To all whom it may concern:*

Be it known that I, CHARLES P. BONNEY, a citizen of the United States, residing at Providence, in the county of Providence and State of Rhode Island, have invented certain new and useful Improvements in Wave-Operated Pumps, of which the following is a specification, reference being had therein to the accompanying drawings.

Like reference characters indicate like parts.

Figure 1 is a view in elevation of my invention in its operative position, the barge being shown in longitudinal section. Fig. 2 is a view (on an enlarged scale) of my invention as seen partly in elevation and partly in vertical diametrical section on line $x$ of Fig. 3. Fig. 3 is a top plan view of the float, on the same scale as Fig. 2. Fig. 4 is a detail view of an air valve used in said float, as seen in central vertical section, and is drawn on a scale much larger than that of Figs. 2 and 3.

My invention relates to a pump operated by the wave motion of water; and it consists of the novel construction and combination of the several parts or elements as hereinafter described and claimed.

In the drawings the reference numeral 1 designates a barge floating in water. A mast 2 rests on the bottom of the barge and extends vertically (or nearly vertically) and is braced and secured in position by a block 3 and bolts 4, or in any other suitable manner. A boom 5 is connected by eyes 6 to the mast 2 and extends therefrom substantially at a right angle. A stay rod 7 connected at its upper end by eyes 8 to the mast 2, near the top thereof, and connected by eyes 9 at its lower end to the outer end of the boom 5, maintains said boom in the horizontal position illustrated in Fig. 1.

A float 10, preferably in the shape of a truncated cone, has a top 11, with a central, circular aperture 12, and an open bottom 13. A funnel 14 is supported concentrically within the float 10, and its sides are shown as parallel to the tapering sides of the float 10, as seen in Fig. 2, which is as well as can be represented by a drawing on so small a scale; but, more accurately stated, the angle of the taper of the funnel should be such that the area of any cross section between the funnel and the tapering sides of the float will be equal to the area of every other cross section.

The top and bottom of the funnel 14 are open, and at its top it is fastened to the top 11 of the float in any suitable manner to form there a water-tight seam. The funnel 14 is also supported by a ring 15, which is parallel to the top 11 of the float, the central opening of which ring fits upon the tapering sides of said funnel nearly midway between its top and bottom, as represented in Fig. 2. The ring 15 is fastened all along its outer periphery to the tapering inner surface of the float 10, and is also fastened all along its inner periphery to the tapering outer surface of the funnel 14, and on both said peripheral edges the seams are water-tight.

Two ear-pieces 16 have each an angular bend by which they fit upon and are fastened to the funnel 14 near the top thereof, as seen in Fig. 2, and above the top 11 of the float extend upwardly parallel to each other at right angles with said top and they are diametrically opposite. A gimbal ring 17 has two diametrically opposite studs 18, which are mounted loosely in bearings in the ear-pieces 16. Nuts 19, 20, engage each of the studs 18, which are threaded for that purpose and these nuts extend along the outer and inner sides of said ear-pieces, respectively.

A cylinder 21 has its upper end covered with a cap 22, having an annular flange which shuts down tightly over the upper end of the cylinder. The cap has a stuffing box 23, packed as usual, and a piston rod 24 passes loosely up through a central aperture made therefor in said cap and also up through said stuffing box, as fully represented in Fig. 2. At the lower end of the rod 24, a piston is supported therefrom by a three-branched piece 25. The piston consists of an upper circular plate 26, which fits the bore of the cylinder 21, and also of a ring-shaped lower plate 26ª, which is practically a horizontal flange of a metallic pipe 27; and between said two plates is a leather or other packing 28, which is preferably cup-shaped, as usual, and illustrated in Fig. 2. Each of the three branches of the part 26 passes through said two plates and packing and is screwed thereto by nuts, as shown in Fig. 2.

An air valve is inserted through one side of the float 10, below the partition or ring 15. The detail of the valve is shown in Fig. 4. A tube 29, 29, is secured in a hole made for its reception through one side of the float 10, which tube has an interior screw-thread. A tube 30 has an open end, an exterior screw-thread, a shoulder 31, and a cap or cover 32, the latter being provided with a central opening 33. A tube 34 is mounted in the tube 30, and has its inner end 35 provided with a central beveled valve-seat 36. A ball valve 37 is movably mounted in the tube 34. A stem 38 having an annular flange at each end is loosely mounted in the tube 34. A spiral spring 39 is contained loosely in the tube 34 and presses at one end against the ball 37 and at the opposite end against the inner flange of the stem 38. An annular inwardly directed flange at the outer end of the tube 34 limits the outward movement of the spiral spring 39.

The upper end of the piston rod 24 is fastened by its eye 40 to an eye bolt 41, near the outer end of the boom 5.

A pipe 42 is coupled to the pipe 27, as shown at 43, and has a diagonally extending branch 44. At the outer end of the branch pipe 44 is a valve, having a flap 45, indicated by dotted lines. At the bottom of the pipe 42 it is coupled, as shown at 46, to a curved pipe 47, and the pipe 47 is coupled, as shown at 48, to a valve 49, the flap 50 of which is indicated in dotted lines. A coupling 51 connects the valve 49 to a flexible pipe 52. In the barge 1 is a stand pipe or reservoir 53, having an inlet 54. The flexible pipe 52 passes through a properly packed tube 55 in the end of the barge 1 and is coupled to the inlet 54 of the stand pipe or reservoir 53.

The cylinder end or cap 22 has two diametrically extending hubs 56 each terminating in a stud 57, which passes loosely through a hole in the ring 17, and thus a gimbal is formed as most plainly shown in Fig. 3.

Having thus described the several parts of my invention, I will proceed to explain the operation and purpose of the same. This apparatus is placed in a position where the normal water line 58 is subject to wave action. This wave action of the sea, or other natural body of water, so affected, furnishes the motive power, by means of which a quantity of water is transferred from the sea, or other natural body of water, into a reservoir or stand pipe, in which it rises to a level considerably above the said normal water level 58. The water so accumulated or stored under head or pressure in the reservoir or stand pipe is dispensed to a turbine or other motor (not shown) to operate machinery, compress air or to do any other work for which it is adapted.

The buoyancy of the float 10 in the water, in which its large open end is submerged, is caused by the air confined in its upper closed chamber, designated as A in the drawings.
As the waves rise and fall, the float 10 rises and falls with them. It is seen that the piston does not slide within the cylinder 21, but that the cylinder 21 slides on the piston. The fact that the float 10 has a great freedom of movement angularly, due to the direction and intensity of the wave force, does not unfavorably affect this cylinder and piston action, because the cylinder 21 is able to maintain its perpendicular (or approximately perpendicular) direction by means of its gimbal connection with the float, the conical shape of the funnel 14 allowing great changes of position of the float 10 under the stress of the waves without coming into contact with the cylinder 21, as is apparent from an inspection of Figs. 2 and 3, where this gimbal construction and function are clearly illustrated.

Whenever the float 10 rises with the wave, wherein it is for the instant buoyant, the cylinder 21 slides upward along the piston. The piston then sucks water, as indicated by the arrow 59 in Fig. 2, up, past the flap valve 45 (which it lifts), through the pipes 44 and 27, the flap valve 50 being the meanwhile closed by the same suction of the piston. When the wave descends, the float 10 descends with it, whereupon the piston pressure in the cylinder 21, so caused, closes the flap valve 45 and opens the flap valve 50. The water which has been sucked up, as already described, is thus discharged through the pipes 42, 47, and the valve 49 and flexible pipe 52, as indicated by the arrow 60 in Fig. 2, into the stand pipe or reservoir, where by repeated operations of the cylinder and piston, like that just explained, the water level attains a height indicated by the reference numeral 61 and as illustrated in Fig. 1 (or to some other height considerably) above the general water level 53 of the sea, or other natural body of water. When this discharging action of the cylinder and piston has ceased and the intake of the water, as indicated by the arrow 59, has begun again, the water pressure in the stand pipe or reservoir 53, as also the suction of the piston in the cylinder, closes the valve 50 again and prevents any discharge of water backward through the pipe 52. The water, so accumulated in the reservoir or stand pipe 53, becomes a source of power by gravitation, being supplied to an engine or motor of any suitable kind (not shown) to do any mechanical work for which it is appropriate.

It is to be understood that the apparatus, shown in Fig. 2, is only one of a plurality of similar devices, each working separately by the wave action to which it happens to be subjected, but each discharging into the general reservoir or stand pipe 53. If the wave action is small in extent, the piston action is correspondingly small and the quantity of water contributed thereby to the reservoir or stand pipe is correspondingly small, but if the wave action is extensive, each rise and fall of the float results in a considerable discharge into the reservoir or stand pipe. As these devices are independent of each other and are constantly operating, day and night, and the number of such devices at work may be increased to any desired extent, and as they are operated by a prime motive power which is free and inexhaustible, any desired quantity of water can be stored up and utilized, limited only by the size of the reservoir or stand pipe, which contains it.

The gravitative efficiency of the device is greatly increased by the use of the air valve, illustrated in detail in Fig. 4. This valve action is automatic. As the float descends, the water rises slightly up into the open end of the float, and so forms a closed chamber, marked B in the drawings, which is filled with air, more or less compressed by the atmospheric pressure exerted upon the surface 58 of the water outside of the float, as is well understood in natural philosophy. This air volume, so confined in the chamber B, increases the buoyancy of the float 10. But it is desired to prevent this additional buoyancy in order that the float may be more deeply submerged and the force of gravitation may be increased. Accordingly, the air valve becomes an important adjunct. As soon as the air in the chamber B has a tendency to be compressed, as described, it moves, as indicated by the arrow 62 in Fig. 4, and presses the ball 37 inwardly in the tube 34, and moves it from the valve seat 36, overcoming the pressure of the spring 39. Thus the stem valve 38 is pushed outwardly, opening the air vent 33 and the air is expelled, as indicated by the arrows 63 in Fig. 4. As the air is thus expelled from the chamber B of the float, the water flows up into said chamber and fills the same, but as the water pressure within the chamber B is the same as the water pressure outside the chamber B, the spring 39 presses the ball 37 back into the valve seat 36 and the water is imprisoned in the chamber B. The force of the wave, however, is as effective as before, and as it rises, elevates the float and also the volume of water in the chamber B, which volume is now at a height above the normal water level 58. Therefore, instead of increasing the buoyancy of the float 10 by the air-contents of the chamber B, the air valve allows the escape of the air from the chamber B, and consequently when the float 10 rises by the upward movement of the wave the chamber B is full of water, which volume of water remains in the chamber B, even when its own level is higher than the normal water level 58. This additional volume of water, thus elevated above the normal water level 58, has weight, and by its gravity increases the total weight of the float 10 and facilitates submergence of the float. Thus the rise of the float 10 and its connected cylinder 21 is caused by the rise of the wave, and this movement results in an intake of water through the valve 45; but the subsidence of the wave causes the submergence of the float 10 and the consequent discharge of the water (which has been so admitted by the valve 45) out through the valve 50 into the reservoir or stand pipe 53.

Instead of having the reservoir or stand pipe carried on a barge or float, it may be erected on any stable foundation, or upon dry land, or at any suitable location on the shore.

It is evident that the reservoir is not an essential part of this invention, for the water raised and discharged by the piston action, which results from the rise and fall of the float, as the wave swells and subsides, may be discharged directly by pipe connection to a turbine, or other motor (not shown) with a pressure sufficient to operate the same, without an intermediate reservoir or head of water.

I claim as a novel and useful invention and desire to secure by Letters Patent:—

1. The combination of a float adapted to be partially submerged in a body of water which is subject to wave action; a cylinder carried by the float and having a centrally perforated upper end and an open bottom; a piston movable in the cylinder; a piston rod connected at its lower end with the piston and hung at its upper end to a support, and passing slidably through the perforation in the cylinder cover; a reservoir; a pipe connection between the cylinder and reservoir; an intake valve in the pipe adapted to operate by suction as the float and cylinder rise with the wave; and a discharge valve in the pipe adapted to operate by the pressure of the piston as the float and cylinder descend by the subsidence of the wave.

2. The combination of a float adapted to be partially submerged in a body of water which is subject to wave action; a cylinder carried by the float and having a centrally perforated upper end and an open bottom; a piston movable in the cylinder; a piston rod connected at its lower end with the piston and at its upper end hung upon a support, and passing slidably through the perforation of the cylinder cover; an intake valve in the pipe adapted to operate by suction as the float and cylinder rise with the wave; and a discharge valve in the pipe adapted to operate by the pressure of the piston as the float and cylinder descend by the subsidence of the wave.

3. The combination of a ring-shaped float movable by its buoyancy in a body of water which is subject to wave action; a cylinder loosely hung at its upper end in the central opening of the float, which cylinder has a centrally perforated upper end and an open bottom; a piston movable in the cylinder; a piston rod connected at its lower end with the piston and at its upper end hung upon a support, and passing slidably through the perforation of the cylinder cover; a reservoir; a pipe connecting the cylinder and reservoir; an intake valve in the pipe adapted to operate by suction as the float and cylinder rise with the wave; and a discharge valve in the pipe adapted to operate by the pressure of the piston as the float and cylinder descend by the subsidence of the wave.

4. The combination of a ring-shaped float having the form of a truncated cone and movable by its buoyancy in a body of water which is subject to wave action; a centrally-located funnel in the float and connecting therewith and which has an open top and an open bottom; two ear pieces extending up from the upper edge of the funnel and located diametrically opposite each other; a cylinder having a centrally perforated upper end and an open bottom and extending down through said funnel axially thereof; a gimbal connecting the upper end of the cylinder and said two ear pieces; a piston movable in the cylinder; a piston rod passing slidably through the perforation in the cylinder cover and connected at its lower end with the piston and hung at its upper end upon a support; a reservoir; a pipe connecting the cylinder and reservoir; an intake valve in the pipe adapted to operate by suction as the float and cylinder rise with the waves; and an outlet valve in the pipe adapted to operate by the pressure of the piston as the float and cylinder descend by the subsidence of the wave.

5. The combination of a ring-shaped float open at the bottom and having an annular air chamber in its upper part parallel to its upper surface, which float is in the form of a truncated cone and is movable by its buoyancy in a body of water where there is wave action; a centrally located funnel in the float and concentric therewith and which has an open top and an open bottom; two ear pieces extending up from the upper edge of the funnel and located diametrically opposite each other; a cylinder having a centrally perforated upper end and an open bottom and extending down through said funnel axially thereof; a gimbal connecting the upper end of the cylinder and said two ear pieces; a piston movable in the cylinder; a piston rod passing slidably through the perforation in the cylinder cover and connected at its lower end with the piston and hung at its upper end upon a support; a reservoir; a pipe connecting the cylinder and reservoir; an intake valve in the pipe adapted to operate by suction as the float and cylinder rise with the wave; and an outlet valve in the pipe adapted to operate by the pressure of the piston as the float and cylinder descend by the subsidence of the wave.

6. The combination of a ring-shaped float open at the bottom and having an annular air chamber in its upper part parallel to its upper surface; which float is in the form of a truncated cone and is movable by its buoyancy in a body of water where there is wave action; an automatic air valve through the tapering side of the float beneath said air chamber; a centrally located funnel in the float and concentric therewith and which has an open top and an open bottom; two ear pieces extending up from the upper edge of the funnel and located diametrically opposite each other; a cylinder having a centrally perforated upper end and an open bottom and extending down through said funnel axially thereof; a gimbal connecting the upper end of the cylinder and said two ear pieces; a piston movable in the cylinder; a piston rod passing slidably through the perforation in the cylinder cover and connected at its lower end with the piston and hung at its upper end upon a support; a reservoir; a pipe connecting the cylinder and reservoir; an intake valve in the pipe adapted to operate by suction as the float and cylinder rise with the wave; and an outlet valve in the pipe adapted to operate by the pressure of the piston as the float and cylinder descend by the subsidence of the wave.

7. The combination of a float having the form of a truncated cone; a funnel in the float of the same height as the float but of less diameter and concentric therewith; an annular cover for the float; an annular partition in the float parallel to said cover and having its outer and inner peripheral edges respectively in contact with the float and funnel; an air valve in the float beneath said partition; a cylinder having a perforation in its upper closed end and open at its bottom; a universal joint connection between the cylinder and floats so that the cylinder is capable of maintaining a vertical position in and through the funnel; a centrally perforated piston movable in the cylinder; a piston rod slidable in the perforation of the cylinder cover, and fastened at its lower end to the piston and loosely hung at its upper end from a support; a main pipe having its upper open end passing through the perforation in the piston; a branch pipe opening into said pipe and having an open lower end; a valve in the branch pipe; a valve in the main pipe; a reservoir; and a flexible pipe coupled to the last named valve and entering said reservoir.

8. In a wave-operated pump, the combination of a relatively movable cylinder; a relatively fixed piston on which the cylinder is movable; a reservoir; a valved main pipe mounted at one end in the piston and connected at its opposite end to the reservoir; and a valved branch pipe opening into the main pipe.

9. In a wave-operated pump, the combination of a cylinder and a piston, one of which is stationary and the other movable; a reservoir; a valved pipe adapted to supply water to the cylinder and piston, and a valved pipe adapted to discharge water from the cylinder into the reservoir.

10. The combination of two floats buoyant in a body of water, which is subject to wave action; a reservoir carried by one of the floats; a piston; a flexible pipe connection between the piston and reservoir; a cylinder carried by the other of said floats and movable on the piston; and valves in said pipe connection, respectively, for the admission and discharge of water.

11. The combination of a float buoyant in a body of water which is subject to wave action but by its weight comparatively stable in position; a reservoir carried upon said float; a second float buoyant in the same body of water but of a smaller size and more affected by wave motion than the first named float; a cylinder carried by the second float and movable therewith; a piston rod carried by the first named float; a piston in the cylinder secured to the bottom of the piston rod; a main pipe having an outlet valve and extending from the piston to the reservoir; and a branch pipe having an inlet valve adapted to supply water to the main pipe.

12. The improved apparatus for elevating water herein described, consisting of the combination of a barge 1, buoyant in water; a mast 2 in said barge; a boom 5 extending from the mast and suspended from a stay 7; a piston rod 24 hung from the end of the boom; a cylinder 21; a piston 26, 26$^a$, provided with a packing 28 and having a central aperture; a pipe 27 mounted in said aperture of the piston; a curved pipe 47; a pipe 42 coupled at the upper end to the pipe 27 and at the lower end to the pipe 46; a branch pipe 44 opening into the pipe 42; an admission valve 45 at the outer end of the branch pipe 44; a discharge valve 49, coupled to the lower end of the pipe 47, a flexible pipe 52 coupled at one end to the valve 49 and passing through the side of the barge, and a reservoir 53 carried by the barge and into which the flexible pipe 52 enters.

In testimony whereof I affix my signature in presence of two witnesses.

CHARLES P. BONNEY.

Witnesses:
   HOWARD A. LAMPREY,
   WARREN R. PERCE.